Nov. 3, 1953 J. H. BRODHUN 2,657,453
MACHINE TOOL OF THE SCREW MACHINE TYPE
Filed Feb. 24, 1948 12 Sheets-Sheet 2

INVENTOR.
JOHN HENRY BRODHUN
BY
*Whittemore Hulbert & Belknap*
ATTORNEYS

Nov. 3, 1953  J. H. BRODHUN  2,657,453
MACHINE TOOL OF THE SCREW MACHINE TYPE
Filed Feb. 24, 1948  12 Sheets-Sheet 3

FIG. 3.

*INVENTOR.*
JOHN HENRY BRODHUN
BY
ATTORNEYS

Nov. 3, 1953 J. H. BRODHUN 2,657,453
MACHINE TOOL OF THE SCREW MACHINE TYPE
Filed Feb. 24, 1948 12 Sheets-Sheet 6

INVENTOR.
JOHN HENRY BRODHUN
BY
*Whittemore Hulbert & Belknap*
ATTORNEYS

Nov. 3, 1953                J. H. BRODHUN                2,657,453
           MACHINE TOOL OF THE SCREW MACHINE TYPE
Filed Feb. 24, 1948                              12 Sheets-Sheet 7

INVENTOR.
JOHN HENRY BRODHUN
BY
*Whittemore Hulbert & Belknap*
ATTORNEYS Nov. 3, 1953     J. H. BRODHUN     2,657,453
MACHINE TOOL OF THE SCREW MACHINE TYPE
Filed Feb. 24, 1948     12 Sheets-Sheet 8

INVENTOR.
JOHN HENRY BRODHUN
BY
ATTORNEYS

Nov. 3, 1953                J. H. BRODHUN                2,657,453
                MACHINE TOOL OF THE SCREW MACHINE TYPE
Filed Feb. 24, 1948                              12 Sheets-Sheet 9

INVENTOR.
JOHN HENRY BRODHUN
BY
Whittemore Hulbut & Belknap
ATTORNEYS

Nov. 3, 1953  J. H. BRODHUN  2,657,453
MACHINE TOOL OF THE SCREW MACHINE TYPE
Filed Feb. 24, 1948  12 Sheets-Sheet 10

INVENTOR.
JOHN HENRY BRODHUN
BY
ATTORNEYS

FIG.17.

Nov. 3, 1953    J. H. BRODHUN    2,657,453
MACHINE TOOL OF THE SCREW MACHINE TYPE
Filed Feb. 24, 1948    12 Sheets-Sheet 12

*INVENTOR.*
JOHN HENRY BRODHUN
BY
Whittemore Hulbert & Belknap
ATTORNEYS

Patented Nov. 3, 1953

2,657,453

UNITED STATES PATENT OFFICE 2,657,453

MACHINE TOOL OF THE SCREW MACHINE TYPE

John Henry Brodhun, Birmingham, Mich.

Application February 24, 1948, Serial No. 10,295

4 Claims. (Cl. 29—39)

The invention relates to automatic screw machines of the single spindle type in which bar stock or magazine feed parts are gripped by a collet of a rotary spindle and rotated at pre-set suitable speeds to perform in cooperation with associated tools and feed mechanism therefor cutting operations for fashioning the stock to the desired shape.

It is the primary object of the invention to obtain an improved and simplified machine of this general type with which the preliminary work of tooling up, preparing the cams and otherwise adjusting or setting the machine for a particular job is simplified and requires less skill and experience on the part of the operator.

It is a further object to obtain a construction which facilitates quick adjustment for change of work and also provides for a greater range of adjustment.

With these objects in view the invention consists, first, in a construction formed of a plurality of unit assemblies, which are mounted in operative relation to each other.

The invention further consists in a construction in which an end tool operating assembly including an electric motor, a step down transmission, a reciprocatory carriage, a tool holding turret thereon, a cam shaft and a cam is adjustable as a unit towards or from the work holding rotary spindle in a direction axially thereof so as to accommodate work varying in dimensions.

The invention further consists in a construction in which the step down transmission together with all other fast running parts of said assembly are enclosed in a housing whereby they may be run in lubricant.

The invention further consists in a construction in which the tool holding turret has its axis arranged at an oblique angle to the axis of the rotary spindle to provide greater clearance for the tools of said turret when out of working position.

The invention further consists in a construction in which the amplitude of reciprocatory movement imparted to the carriage may be varied independently of the contour of the controlling cam so as to obtain a suitable indexing stroke for longer or shorter work.

The invention further consists in a construction in which this independent adjustment means is located in an accessible position to facilitate quick change.

The invention further consists in a construction in which the speed of the indexing drive is adjustable so as to perform this operation in a minimum of time.

The invention further consists in a construction in which these assemblies are so arranged on the supporting bed or frame as to leave a clear space forward of the axis of the rotary spindle for accessibility to the work and for receiving chips and shavings.

The invention further consists in the construction and arrangement of the various parts of the mechanism as more fully hereinafter described.

The main frame of the machine is preferably in the form of the cabinet A. On the top of this cabinet is mounted the rotary spindle B provided with a work holding collet B' which spindle is driven from a motor C through the medium of a variable speed transmission mechanism D, both motor and transmission being located within the cabinet. The spindle is journaled in a frame E which on its front face and on opposite sides of the spindle is provided with a slideway E' for transversely movable tool carrying cross-heads F and F'. The end working tools are carried by a turret which, as above described, forms an element of a unit assembly of the following construction.

End tool operating assembly

Figure 1:
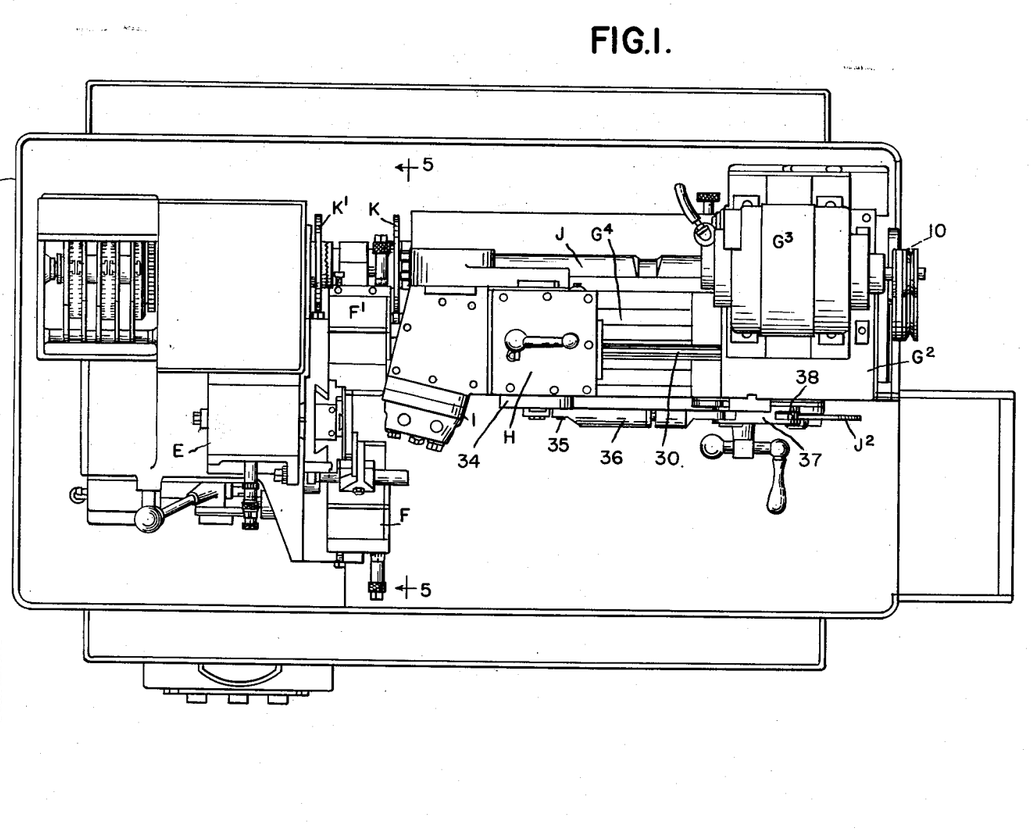
Fig. 1 is a plan view of the machine.

Upon the cabinet A to right and in rear of the spindle (Figs. 1, 2 and 3) is a longitudinally extending slideway A' on which is adjustably mounted an assembly G. This assembly comprises a frame having a base portion G' engaging the slideway A', a transmission housing $G^2$ at the right and extending upward above the portion G' and an electric motor $G^3$ mounted on the top of the transmission housing. On the top of the base portion G' is a longitudinally extending slideway $G^4$ on which is mounted a reciprocatory carriage H for a tool holding turret I together with the indexing mechanism therefor. The tools engaged with the turret must be successively aligned with the axis of the rotary spindle, so that during successive reciprocations of the carriage the work in the spindle will be fashioned by said tools. It is desirable that the reciprocating mechanism for the carriage should be located as nearly as possible to the axis of the spindle. However, as the turret is between the spindle and this mechanism, I avoid interference by arranging the turret axis at an oblique angle to the axis of the spindle but with each of the tools carried by the turret aligned with the spindle axis when in working position. In other words the turret tools instead of remaining always in the vertical plane of the axis of the spindle are moved out of this plane in all positions other than the working position. Consequently, the carriage reciprocating means can be arranged very nearly in alignment with the spindle axis without interference with the turret or any of the tools carried thereby.

Figures 2, 6:
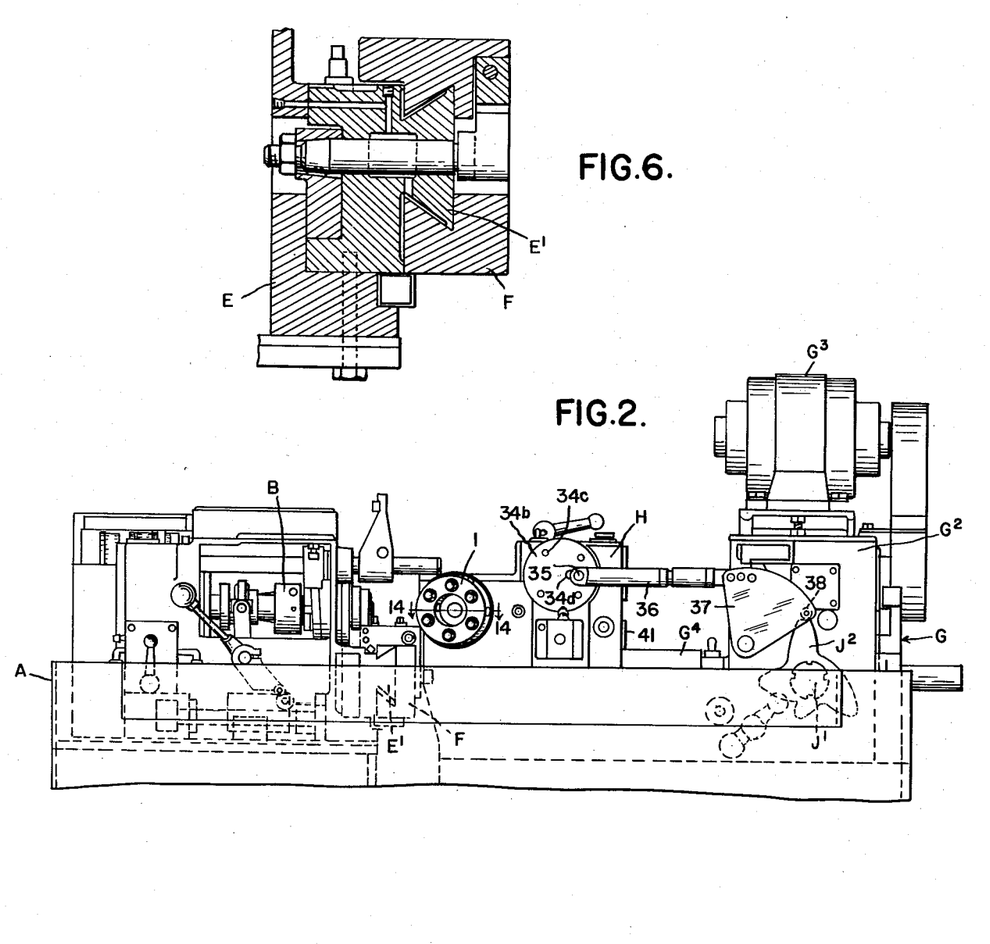
Fig. 2 is a front elevation thereof.
Fig. 6 is a section on line 6—6, Fig. 5.
Figure 3:
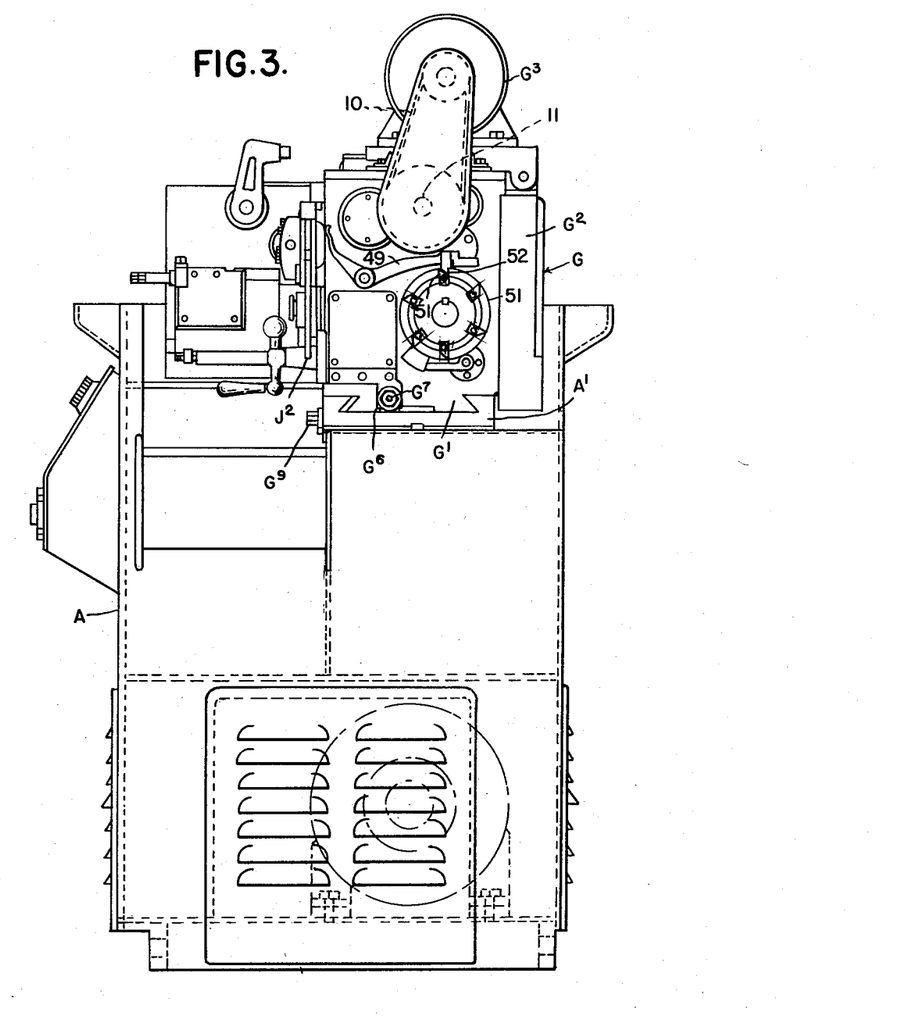
Fig. 3 is an end elevation.
Figure 4:
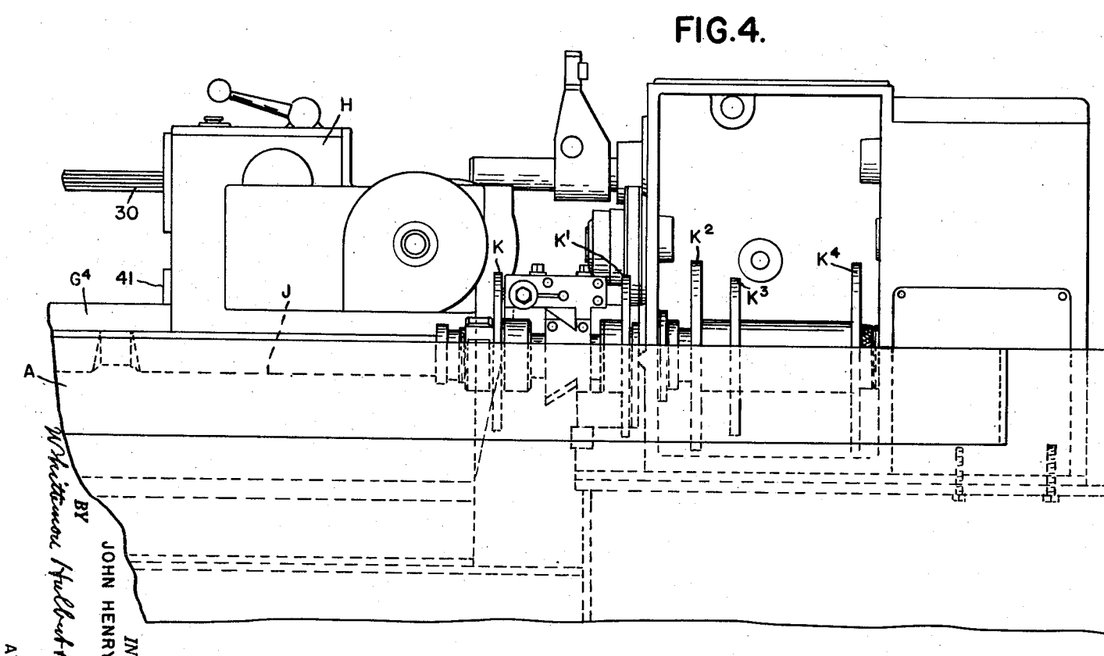
Fig. 4 is a rear elevation of a portion of the machine.
Figure 5:
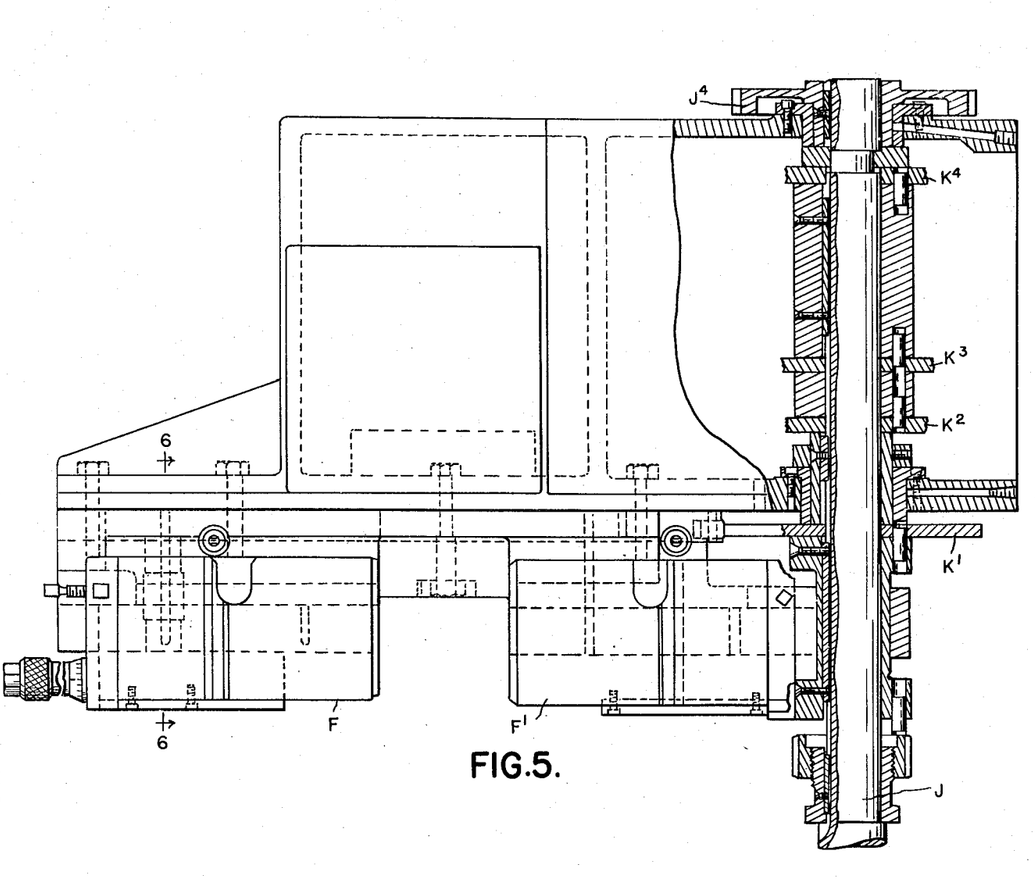
Fig. 5 is a plan view partly in section of the cross heads and cams therefor.
Figure 7:
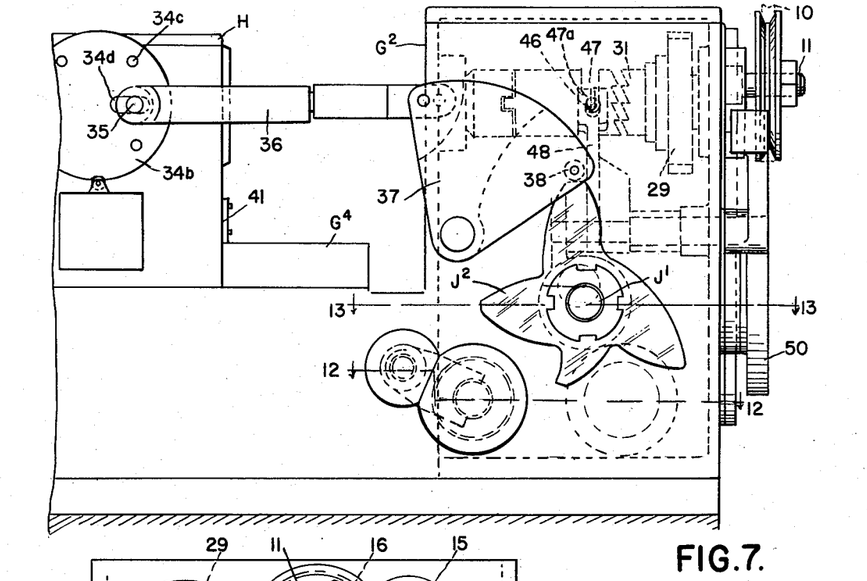
Fig. 7 is a sectional elevation of a portion of Fig. 2.
Figure 8:
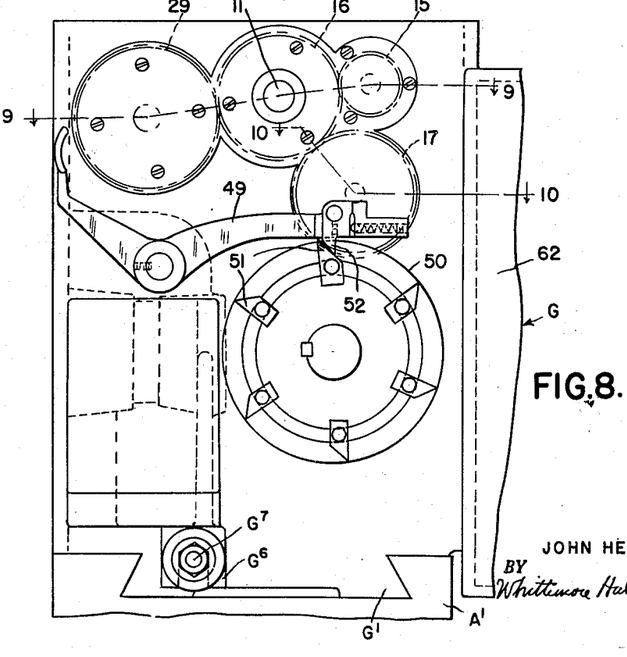
Fig. 8 is an end elevation of Fig. 7.
Figure 9:
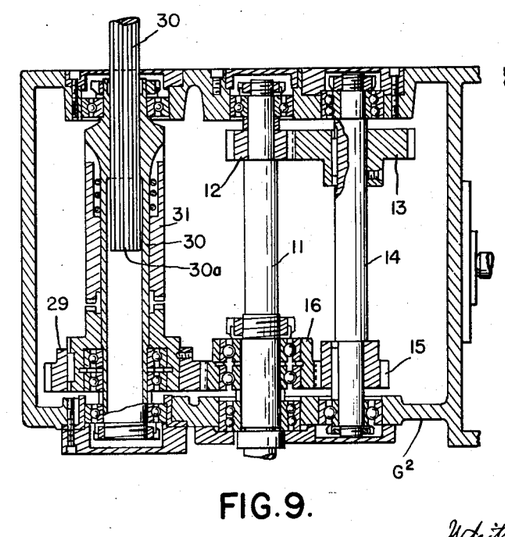
Fig. 9 is a horizontal section on line 9—9 Fig. 8.
Figure 10:
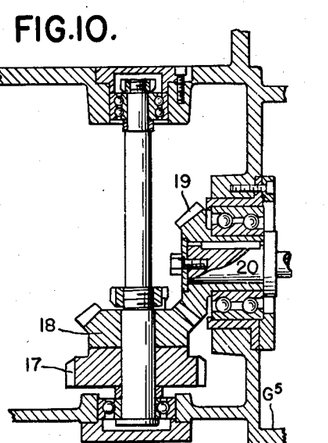
Fig. 10 is a section on line 10—10, Fig. 8.
Figure 11:
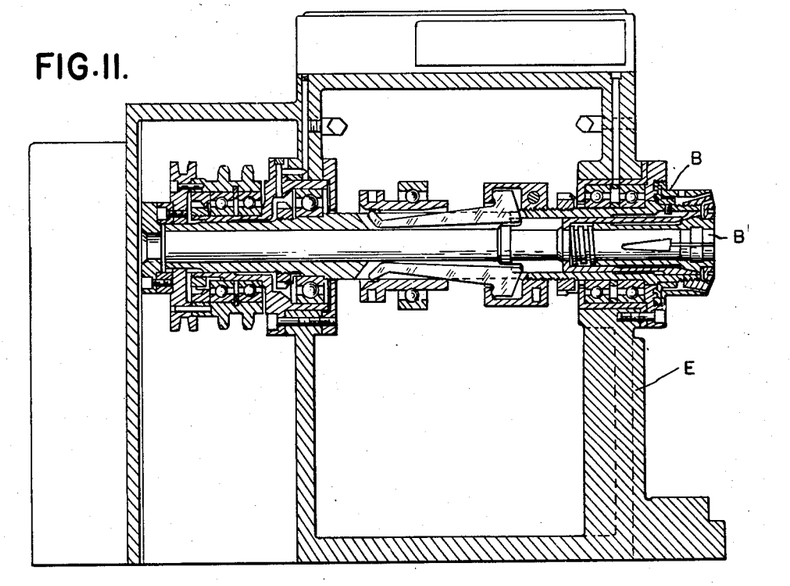
Fig. 11 is a vertical longitudinal section in the plane of the axis of the work holding spindle.
Figure 12:
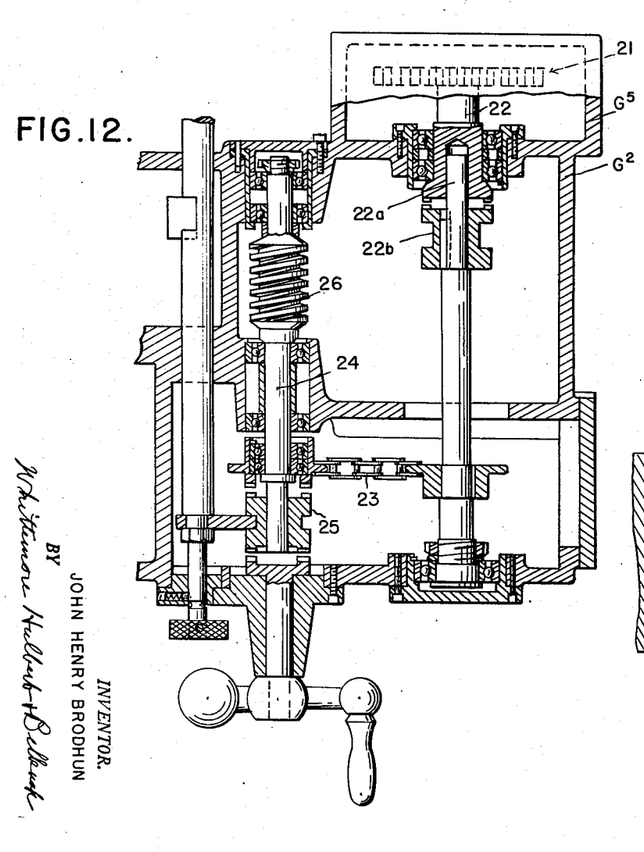
Fig. 12 is a horizontal section on line 12—12 Fig. 7.
Figure 13:
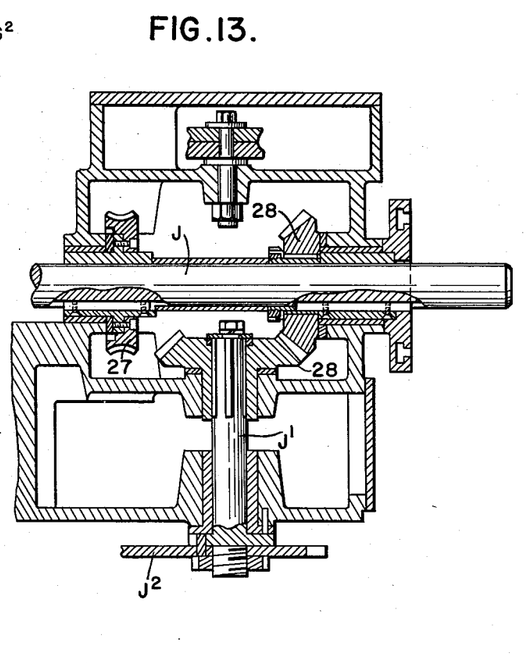
Fig. 13 is a horizontal section on line 13—13, Fig. 7.

The motor $G^3$ is used not only for operation of the carriage H but also for the operation of all of the fashioning and control mechanisms. These include a longitudinally extending main cam shaft J and an auxiliary cam shaft J' extending perpendicular to the main cam shaft, both being driven in one-to-one ratio. The auxiliary cam shaft operates a special cam $J^2$ designed for the particular job which the machine is to perform. Its chief function is to actuate the carriage H at properly timed intervals and at preselected speeds thereby successively advancing the tools into operative relation to the work carried by the rotary spindle. However, as the turret is a part of the unit G the relation between the tools and the work may be varied by the adjustment of said unit on the supporting frame which facilitates the setting of the machine for jobs varying in length. Such adjustment means is shown in Figs. 3 and 8 in which $G^6$ is a lug projecting upward at the end of the slideway A'. $G^7$ is a micrometer screw engaging said lug and bearing against the end of the base G' through which said base can be adjusted longitudinally with respect to said slideway and $G^9$ are clamping screws for securing the parts in adjusted position.

Driving and transmission mechanism

Before describing more in detail the turret and its reciprocating and indexing mechanism, I shall trace the driving train from the motor $G^3$ to the various mechanisms operated thereby. From the motor $G^3$ a two speed pulley and belt connection 10 transmits rotary motion to a shaft 11 extending longitudinally within the housing $G^2$. Intermeshing gears 12 and 13 connect the shaft 11 with a parallel shaft 14 having also mounted thereon within the housing a gear wheel 15 in mesh with a gear wheel 16 which latter is sleeved upon but not rotatably connected to the shaft 11. The gear wheel 16 is in mesh with the gear wheel 17 connected to a beveled gear wheel 18 which in turn is in mesh with a beveled gear wheel 19 on a shaft 20 extending transverse to the shafts 11 and 14 and into a separate compartment or gear box $G^5$ on the rear side of the housing $G^2$. In this gear box are exchange gears 21 for driving at variable speeds a shaft 22 extending into the housing $G^2$ parallel to the shaft 20 and in alignment with a shaft 22a to which it is connected by a clutch 22b. A sprocket and chain drive 23 transmits motion from the shaft 22a to a parallel shaft 24 but through the medium of a clutch 25. The shaft 24 has thereon a worm 26 which is in mesh with a worm wheel 27 splined upon the cam shaft J. Thus when the clutch 25 is engaged the cam shaft J will be driven from the motor at a greatly reduced rotary speed. The cam shaft J' is driven from the cam shaft J through beveled gear wheels 28 to rotate at the same angular speed and the cam shaft J' actuates the special cam $J^2$. In addition to the transmission line just described, there is another line including a gear wheel 29, in mesh with the gear wheel 16, mounted on the hollow shaft 30 which extends longitudinally within the housing $G^2$. A shaft 30a within and having a spline engagement with the hollow shaft 30 extends beyond the same into a gear housing H' on the carriage H. Here it has a swivel engagement 30b with said housing so as to travel longitudinally therewith. The shaft 30a is also connected by beveled gear wheels 32 to a transversely extending shaft 33 which passes out through the front wall of the housing H' and has mounted thereon an eccentric shown as formed by a disk 34 and crank pin 35. The shaft 33 forms a part of the indexing mechanism to be later described, but the eccentric forms a part of the carriage reciprocating means. A normally released clutch 31 forms a driving connection between the gear wheel 29 and the shaft 30 so that the latter is normally stationary. However, as later described, upon the tripping of the clutch a single revolution will be imparted to the shafts 30 and 30a to operate the indexing mechanism.

Carriage reciprocating means

The crank pin 35 has connected thereto a rod 36 which at its opposite end is connected to a rockable member 37. The member 37 has mounted thereon a roller 38 which is in the path of the cam $J^2$ so that during rotation of said cam in a counter-clockwise direction, as shown in Fig. 2 the member 37 will be rocked, communicating its movement through the rod 36 to the crank pin 35. Assuming that the crank is not rotating and that the pin 35 is located at or about its dead center with respect to the rod 36, movement of the latter will be communicated to the carriage H advancing it along the slideway $G^4$. Such movement is yieldably resisted by springs 39 located in grooves 40 in the slideway $G^4$, said springs bearing against abutments 39a at their forward ends while their rear ends are engaged by fingers 41 depending from the carriage E. Thus the return movement of the carriage will be effected by the thrust of the springs, which maintains the roller 38 in contact with the working surface of the cam $J^2$. Thus far it has been assumed that the crank pin 35 is stationary, but as will be later explained the indexing of the turret occurs during the reciprocation of the carriage and will increase the amplitude of reciprocatory movement by the throw of said crank pin.

Indexing mechanism

Figures 14, 15:
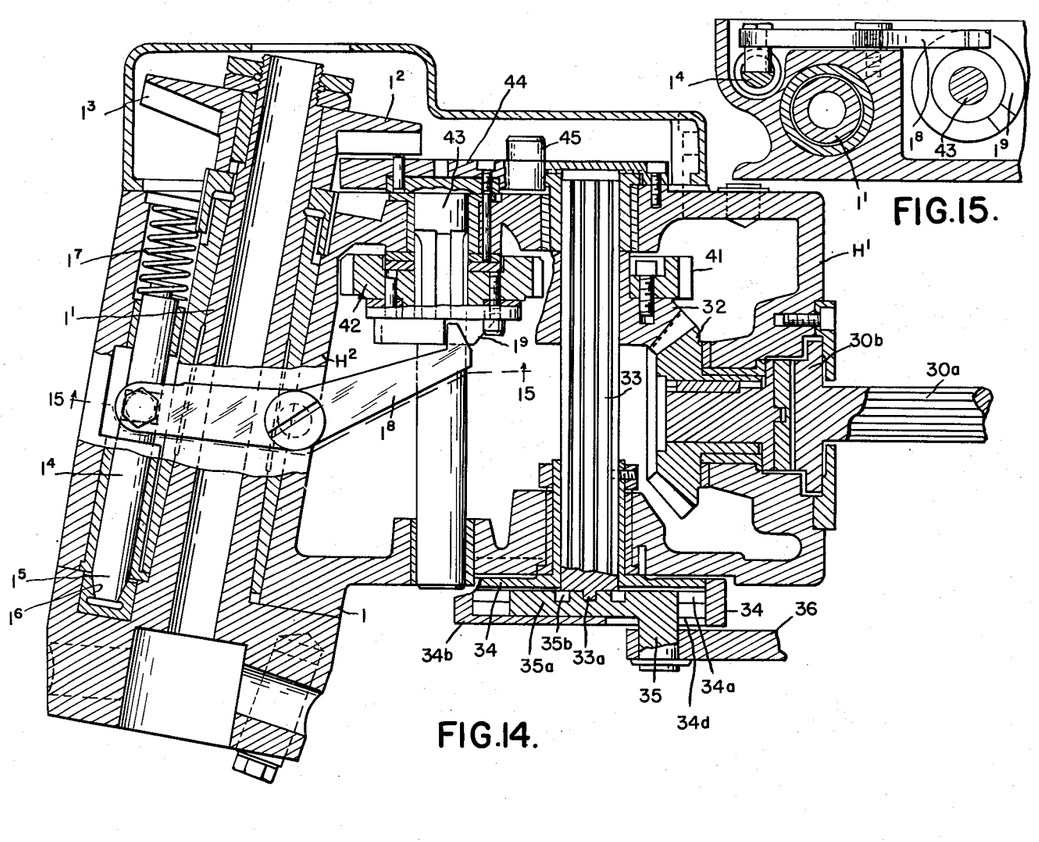
Fig. 14 is a sectional plan view on line 14—14 Fig. 2.
Fig. 15 is a section on line 15—15, Fig. 14.
Figures 16, 16A:
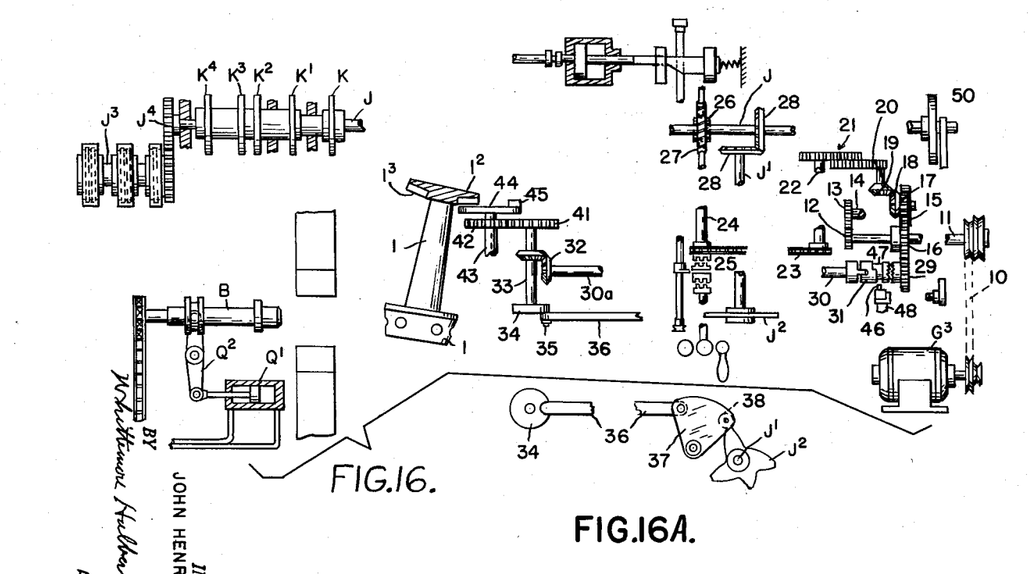
Fig. 16 is a diagrammatic plan view of the machine.
Fig. 16A is a front elevation of a portion of Fig. 16.
Figure 17:
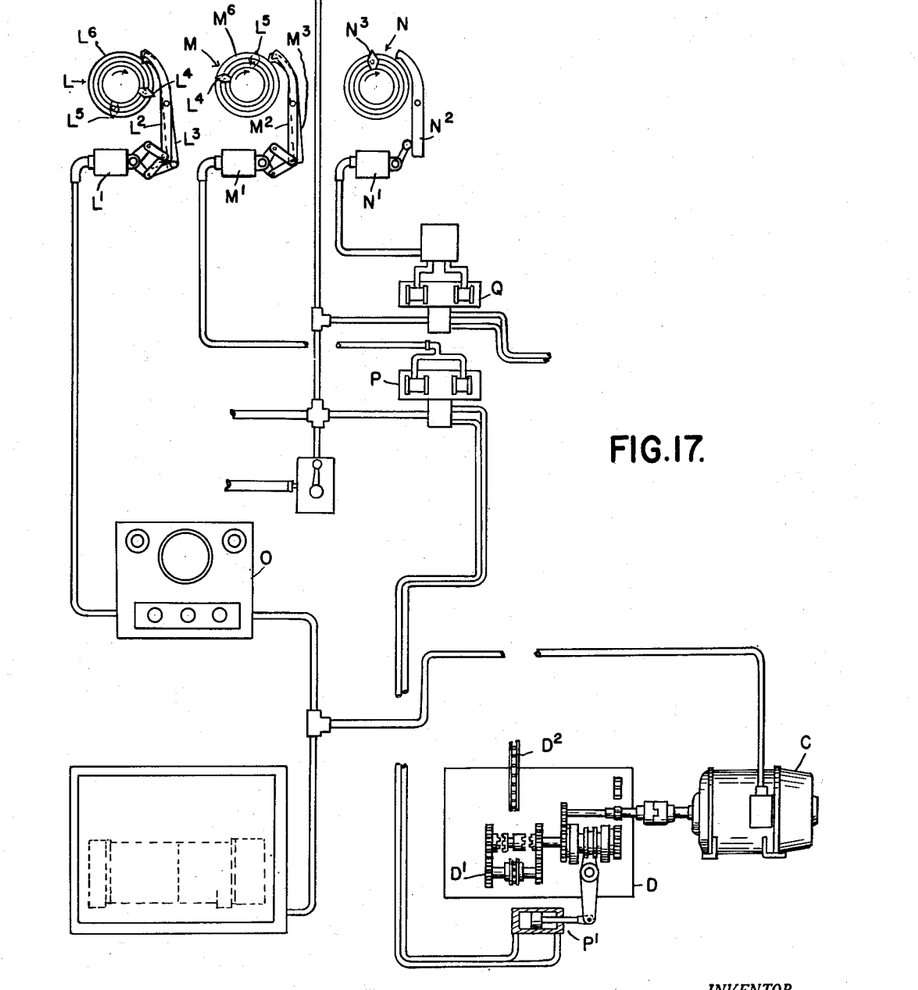
Fig. 17 is a diagrammatic elevation thereof.
Figure 18:
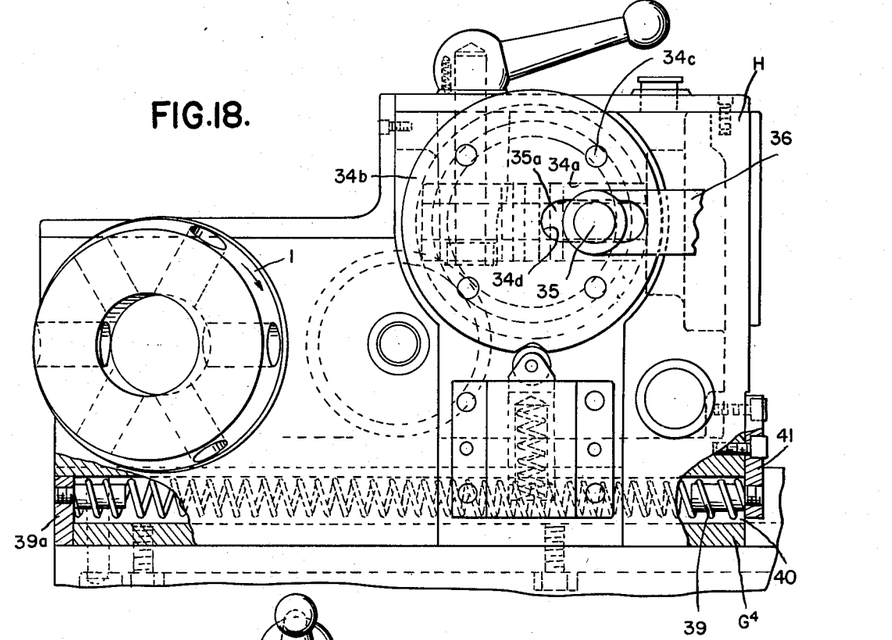
Fig. 18 is a side elevation partly in section of the turret holding carriage.
Figure 19:
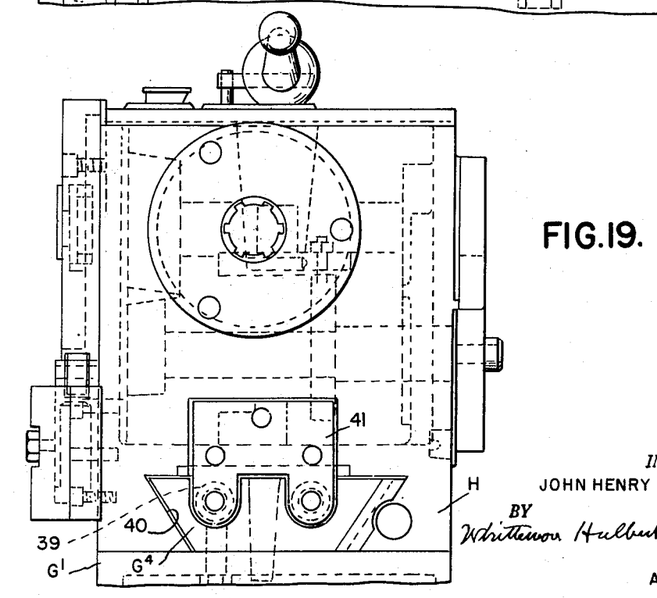
Fig. 19 is an end elevation thereof.

After each reciprocation of the carriage H, the turret must be indexed to bring another tool into alignment with the work in the spindle, the indexing mechanism being of the following construction. The shaft 33 has mounted thereon a gear wheel 41 in mesh with the gear wheel 42 on a parallel shaft 43 which is intermediate the shaft 33 and the turret I. It has been stated that the axis of the turret is oblique to the axis of the spindle and, consequently, the turret axis is non-parallel to the shafts 33 and 43. However, the intermittent rotary movement is transmitted from the shaft 43 to the turret through the medium of a Geneva movement, including a disk head 44 on the shaft 43 and a roller crank pin 45 projecting from the disk. As shown in Fig. 14, the turret I has a shank I' which is journaled in a bearing H² in the housing H'. The rear end of this shank has mounted thereon a conical member I² which has a series of radially extending slots I³ therein corresponding in number to the tool sockets in the turret. The cone angle of the member I² is such that the slots I³ will extend substantially parallel to the plane of the disk 44, and during each revolution of this disk the crank pin 45 will engage one of the slots I³ to rotate the member I² from one index position to another. The turret is locked after each indexing operation by a locking bolt I⁴ which is slidably mounted within the housing H' and has a tapered end portion I⁵ for successively engaging sockets I⁶ in the rear face of the turret. A spring I⁷ yieldably actuates the bolt I⁴ towards its locked position. Prior to each indexing rotation of the turret the bolt I⁴ is withdrawn through the operation of a lever I⁸ which is actuated by a cam I⁹ on the gear wheel 42. The arrangement is such that during a portion of the rotation of the disk head 44, while the crank pin 45 is out of engagement with the slot I³, the cam I⁹ will actuate the lever I⁸ to withdraw the bolt. Thus as soon as the crank 45 engages a slot I³ the turret will be free to rotate from one index position to another. As soon, however, as the pin 45 moves out of the slot I³, the cam I⁹ will release the bolt I⁴ permitting it under actuation of the spring I⁷ to relock the turret. The operation of the indexing mechanism just described is effected by a single rotation of the shaft 30 which, as previously described, is brought about by the tripping of the clutch 31 so as to couple said shaft with the gear wheel 29. The clutch 31 is normally held disengaged from the gear wheel 29 by a pin 46 engaging an angular groove 47 in the clutch sleeve, said pin being carried by a rock arm 48. A bell crank arm 49 extends from the rock arm 48 into proximity to a rotary head 50 on the cam shaft J, which head has a series of adjustably positioned trip cams 51 thereon corresponding to the number of index positions for the turret in one cycle. A finger 52 on the arm 49 is actuated by each of the cams 51 to rock the arm 48 and thereby withdraw the pin 46 from the groove 47. A spring 53 actuates the clutch sleeve when released by the pin 46 to instantaneously engage the clutch, but immediately following said pin 46 re-engages the groove 47 and a cam 47a in said groove engaging said pin will move the clutch sleeve out of clutching engagement. In brief, the clutch 31 is engaged upon the tripping of the rock arm 48 but is disengaged at the completion of a single revolution of the shaft 30. As previously described the carriage H is reciprocated by the operation of the cam J² in conjunction with the springs 39 for returning the carriage. The character of movement imparted to the carriage is therefore determined chiefly by the shape of the cam J² which is such as to produce successive reciprocations in one cycle of the cam shaft. This operation does not, however, interfere with the periodic operation of the indexing mechanism as before described and portions of the two operations may occur simultaneously. Thus the rotation of the shaft 30 will rotate the shaft 33, head 34 and crank pin 35 which latter will impart a movement to the carriage H in addition to that produced by the rod 36. This will have the effect of quickly withdrawing the carriage to disengage the tool from the work so that by the time that the pin 45 of the Geneva mechanism engages the slot I³ the tool will have cleared the work to avoid interference with the indexing rotation of the turret.

Adjustable throw crank

The ideal total amount of movement of the carriage is the amount of movement as imparted by the cam J², which is always made to suit a required turning length for the part to be produced, plus a suitable amount of throw from crank pin 35, just sufficient to withdraw and index the turret with tools independent of the cam. Therefore, it would be of advantage to be able to increase or decrease the amount of crank pin throw, relative to the movement obtained from the cam. In other words, the ideal condition would be a short crank throw for short and a larger crank throw for longer work. I have, therefore, devised the following construction through which the throw of the crank can be quickly adjusted. The disk 34 has formed diametrically thereacross a groove or slideway 34a in which is mounted a slide 35a which carries the crank pin 35. The shaft 33 has an axially projecting pin 33a which engages one of a plurality of recesses 35b in the slide 35a so that by changing the engagement of said pin from one recess to another the eccentricity of the crank 35 may be varied. The slide 35a is secured to the disk 34 by a cover plate 34b which is recessed to receive the slide and fits about the periphery of the disk. It is secured to the latter by a plurality of bolts 34c and a radial slot 34d in its front face allows the outward passage of the crank pin 35 in each position of adjustment thereof. As the structure just described is at the front of the machine with nothing to obstruct it such adjustment of the crank throw can be quickly accomplished. The speed of operation of the crank and, consequently, the time required for the reciprocation of the carriage may be varied by changing from one to the other of the two-speed drives in the pulley and belt connection 10. By this, or any other suitable variable speed driving connection, the time required for each cycle in the operation of the machine may be reduced to the minimum necessary for a particular job thereby increasing the output of the machine.

Turret and cross slide controls

The main cam shaft J extends through the transmission housing G² and has a spline connection with the worm 27, gear wheel 28 and head 50 thereon, so that the unit G may be adjusted longitudinally without disturbing said shaft. Beyond the housing G, the shaft extends to the left (Figs. 1 and 2) and has mounted thereon cam vises K and K' for controlling the operation of the cross slides F and F'. Also a plurality of cams $K^2$, $K^3$, etc., for controlling operation of attachments. In addition to these controlling devices, the rotary spindle is controlled as to speed of rotation, direction of rotation and chucking and releasing of the work by a series of trip mechanisms. These trip mechanisms could be mounted directly on the cam shaft J, but for convenience and ease of access they are preferably mounted on a shaft $J^3$ which is arranged at a higher level on the cabinet A but is driven from the shaft J in a one-to-one ratio through gear wheels $J^4$. The trip mechanism L controls the speed of rotation of the motor C. The trip mechanism M controls the direction of rotation of the spindle by controlling a reversing mechanism in the transmission D. The trip mechanism N controls the opening and closing of the collet B' and also the forward feed of the stock through the spindle when the collet is released. The specific construction of means intermediate these trip means and the mechanism actuated thereby is not essential for this might be either mechanical, pneumatic, hydraulic or electrical. I have, however, diagrammatically represented combined electrical and pneumatic controls of the following construction. The motor C is electrically connected to a rheostat O for varying the resistance in the motor circuit and thereby changing the speed of rotation. The rheostat is controlled by relay switches (not shown) which in turn are controlled by a snap switch L'. This switch is operated by a pair of levers $L^2$, $L^3$ which will, respectively, move it to positions for slow speed and high speed operation of the motor. The levers $L^2$ and $L^3$ extend into operative relation to trip fingers $L^4$ and $L^5$ rotatably adjustably mounted on a head $L^6$ on the shaft $J^3$. Thus the finger $L^4$ will at a certain point in the rotation of the head $L^6$ actuate the lever $L^2$ to move the switch L' into low speed position and in like manner the finger $L^5$ will actuate the lever $L^3$ to move the switch L' to high speed position. The trip mechanism M is similar to L and operates an electric switch M' through the medium of levers $M^2$, $M^3$ which in turn are actuated by trip fingers $M^4$ and $M^5$ rotatably adjustably positioned on a head $M^6$. The switch M' operates an air valve P which controls a pneumatic motor P' for shifting a clutch member in the transmission D so as to reverse the direction of rotation of the driven shaft D'. The shaft D' is connected by a sprocket and chain connection $D^2$ with the rotary spindle B and therefore when the direction of rotation of the transmission is reversed this reverses the rotation of the spindle.

The tripping device N controls a switch N' through the medium of a lever $N^2$ and trip finger $N^3$ and the switch controls through a timer relay a pneumatic valve Q for operating a pneumatic motor Q'. This motor shifts a lever $Q^2$ which operates the collet B' so that in one position the collet clamps the work and in the other position releases it.

Operation

With the construction of the machine as above described, the operation is as follows. The assembly G is first adjusted longitudinally upon the slideway A' to properly position the same with respect to the work spindle for the particular job to be performed. The end working tools are mounted on the turret in proper sequence and the special cam $J^2$, which has been fashioned for the particular job, is mounted on the cam shaft J'. The cams 51 are set on the rotary head 50 to properly time the operation of the indexing mechanism. If the work is also to be fashioned by the side operating tools, these are positioned on the cross-slides F and F' and selected cams K and K' are engaged with the cam shaft J to control these slides. Also the trip fingers on the trip mechanisms L, M and N are adjusted to, respectively, control the speed of rotation of the spindle, the direction of rotation thereof and the opening and closing of the spindle collet. When all of these parts have been properly adjusted, the machine is in condition for automatic operation.

As has been previously described, the assembly G can be readily adjusted longitudinally so as to suit work varying considerably in length and without need of consideration as to cam diameter or turret tool clearance. This feature, together with the accessibility of the crank pin 35 for adjusting its throw and also the variable speed drive for the turret indexing mechanism, makes it possible to change very quickly a machine of long turning length with the necessarily slower indexing into one of shorter length, but with rapid indexing. My improved machine is therefore one which facilitates quicker and easier setting up and also combines two types of machines into one and correspondingly expedites work.

As also previously stated, the front of the machine is clear from obstructing mechanism so as to provide free access to the work in the spindle and room for receiving the chips and shavings. Also the special cam $J^2$ is in accessible position at the front as is the case with the crank pin 35, which can be readily adjusted to alter the throw of the crank. My improved machine is therefore one which facilitates quick setting and, consequently, expedites work performance.

What I claim as my invention is:

1. In a machine tool of the screw machine type including a bed and a work holding spindle mounted thereon; a self contained tool holding and operating assembly unit comprising a base longitudinally slidable on said bed, means for locking said base to said bed in different positions of adjustment thereon, a carriage travellingly mounted on said base, a turret on said carriage and a power actuating mechanism mounted on said base including means for reciprocating said carriage and means for periodically indexing said turret.

2. The construction as in claim 1 in which said power actuating means includes an electric motor, a variable speed transmission between said motor and both said carriage reciprocating means and said turret indexing means, and change gearing located in said carriage reciprocating means only for further varying the speed thereof relative to that of said indexing means.

3. The construction as in claim 1 in which said means for reciprocating said carriage includes a cam shaft extending transversely of said base, an exchangeable cam mounted on said shaft in an accessible and observable position, a rockable member actuated in one direction by said cam, a rod connecting said rockable member to said carriage, and resilient means for returning said carriage and rockable member, all of the elements of the said reciprocating means being mounted on said base to maintain the same relative arrangement to each other in all positions of adjustment of said base on said bed.

4. The construction as in claim 2 in which said rod is connected to said carriage through the medium of a revoluble eccentric, which latter is connected to a member of the turret indexing mechanism which makes one complete revolution in each indexing operation, and adjustment means for varying the throw of said eccentric.

JOHN HENRY BRODHUN.

References Cited in the file of this patent

UNITED STATES PATENTS

| Number | Name | Date |
|---|---|---|
| 586,922 | Worsley | July 20, 1897 |
| 604,306 | Davenport | May 17, 1898 |
| 969,433 | Wigglesworth | Sept. 6, 1910 |
| 1,563,669 | Snyder | Dec. 1, 1925 |
| 1,793,279 | Fischer et al. | Feb. 17, 1931 |
| 2,347,372 | Silva et al. | Apr. 25, 1944 |
| 2,379,096 | Meusy | June 26, 1945 |